(12) United States Patent
Hollander

(10) Patent No.: US 6,186,724 B1
(45) Date of Patent: Feb. 13, 2001

(54) STORAGE DEVICE FOR PACKAGED GOODS

(75) Inventor: Rudolf Hollander, Vorden (NL)

(73) Assignee: Dynamic Systems Engineering bv

( * ) Notice: Under 35 U.S.C. 154(b), the term of this patent shall be extended for 0 days.

(21) Appl. No.: 09/316,891

(22) Filed: May 21, 1999

(30) Foreign Application Priority Data

May 22, 1998 (DE) ............................................. 198 23 083

(51) Int. Cl.[7] ..................................................... B65G 1/16
(52) U.S. Cl. .................... 414/276; 198/347.1; 193/35 A; 414/273; 364/478.04
(58) Field of Search .................................. 414/276, 273; 364/478.04, 478.02, 478.06; 198/560, 568, 569, 562, 347.1; 193/38, 39, 35 R, 36, 35 A, 35 G

(56) References Cited

U.S. PATENT DOCUMENTS

| | | | |
|---|---|---|---|
| 3,805,974 | * 4/1974 | Andersson et al. | ............. 414/276 |
| 4,383,598 | * 5/1983 | Newman | ............. 414/276 X |
| 4,527,937 | * 7/1985 | Tomasello, Jr. | ............. 414/276 X |
| 4,915,566 | * 4/1990 | van Elten | ............. 414/276 |
| 5,125,782 | * 6/1992 | Goldschmidt et al. | ....... 198/347.1 X |

FOREIGN PATENT DOCUMENTS

| | | | |
|---|---|---|---|
| 1243106 | * 6/1967 | (DE) | ............. 414/276 |
| 96505 | * 12/1983 | (EP) | ............. 414/276 |
| 57-72505 | * 5/1982 | (JP) | ............. 414/276 |

* cited by examiner

Primary Examiner—Frank E. Werner
(74) Attorney, Agent, or Firm—Robert W. Becker & Associates

(57) ABSTRACT

A computer-controlled storage device for packaged goods has a storage area with parallel storage tracks having a first and a second end, wherein each one of the storage tracks stores only one type of packaged goods. A supply area is positioned at the first end of the storage tracks. The supply area has a feeding device feeding newly arriving packaged goods into a respective one of the storage tracks. An order filling area is positioned at the second end of the storage tracks, wherein in the order filling area packaged goods are compiled to fill a customer order. The order filling area has independently operated removal devices for each one of the storage tracks.

17 Claims, 8 Drawing Sheets

STORAGE DEVICE FOR PACKAGED GOODS

BACKGROUND OF THE INVENTION

The present invention relates to a storage device for packaged goods comprised of a storage area having a plurality of parallel storage tracks for the packaged goods whereby in each one of the storage tracks only one type of goods is positioned, a feeding area at one end of the storage tracks with means for feeding new packaged goods into the respective storage tracks, and an order filling area at the upper end of the storage tracks with removal devices for a computer-controlled transfer of individual packaged goods from the storage track onto a transporting device arranged downstream.

Storage devices which are designed to automatically fill orders from a client have gained wide use in all areas of commerce and especially also in wholesale grocery sales. However, the storage technology, i.e., the static storage of individual packaged goods, is of reduced importance while the dynamic processes and also the transfer (handling) of goods has gained in importance. The goal of modern storage technology is to reduce the residence time of individual packaged goods in the storage facility and to thus reduce the capital overhead that results from large numbers of stored goods.

The known storage devices for automatically filling orders received from a client are multi-shelf systems with storage tracks or aisles that are arranged adjacent to one another and above one another. The shelves of the thus formed storage tracks are provided with roller tracks of freely rotatable rollers and are positioned at a slight downward slant so that at the upper end of the storage track, the so-called loading or supply side, the packaged goods to be transported will move automatically by their own weight along the roller track to the opposite end of the storage track, the removal end or order filling side. The supply of packaged goods onto the supply side is, in general, performed manually by placing the individual packaged goods, received on a pallet, onto the respective designated storage track. Also, the order filling process at the removal side is also usually performed by hand.

However computer-controlled and movable removal devices in the form of conveying devices are also known which can move along the aisles of the shelves at the order filling side. They can thus fill an order by removing the individual packaged goods from the respective storage track and moving it to a central collecting location. The conveying devices can be moved by respective guides in two coordinate directions so that the transporting device can have access to storage tracks arranged atop one another as well as adjacent to one another.

It is an object of the present invention to provide a storage device of the aforementioned kind with which the transfer rate for the packaged goods can be increased, i.e., the residence time of packaged goods in the storage facility can be reduced.

SUMMARY OF THE INVENTION

This object is solved in that each of the storage tracks is provided with its own, independently operated removal device.

With a storage device embodied as suggested an increased transfer rate can be achieved in comparison to known systems because each one of the storage tracks is provided with its own, individually operated removal device which operates independent of the other removal devices of the storage device. It is preferably operated and controlled by a computer. The inventive storage device in this manner provides for an increased transfer rate with which, when used to the full extent, it would be even possible to remove packaged goods from all storage tracks simultaneously in order to fill an order received from a client.

The transport of the goods that have been removed by the individual removal devices from the respective storage track is performed, according to a preferred embodiment of the invention, by a transport device that is continuously driven and extends transverse to the longitudinal direction of the storage tracks along the removal devices.

The individual storage tracks can be embodied by known roller tracks slanted slightly from the supply side to the order filling side of the device whereby freely rotatable rollers are provided. The rollers can be braked individually or in groups.

According to a preferred embodiment, each one of the removal devices is comprised of a horizontal conveyor and a lifting mechanism for at least partially lifting the horizontal conveyor. When actuated, the lifting mechanism will bring the horizontal conveyor into contact with a respective one of the packaged goods so that it is engaged by the horizontal conveyor and is moved in the direction of the transport device arranged downstream.

The number of drive elements and movable individual parts can be reduced by providing a common drive shaft for a plurality of the horizontal conveyors, whereby the drive shaft extends transversely to the storage tracks.

According to a preferred embodiment of the storage device, comprised of storage tracks in the form of roller tracks, it is suggested that the horizontal conveyor can be lifted by the lifting mechanism up to a level in which the effective transport surface of the horizontal conveyor is positioned above the support surface of the roller track on which the packaged goods are resting. In this manner, it is prevented that the packaged goods positioned at the leading edge of the storage track will be positioned in a non-defined position in the area between the storage track and the removal device, i.e., the horizontal conveyor.

In order to ensure safe engagement of the packaged goods, it is also suggested that each of the storage tracks at the end facing the order filling side is provided with an abutment that projects upwardly past the support surface for the packaged goods so that the leading one of the packaged goods is positioned at the abutment, whereby the horizontal conveyor of the removal device can be lifted by the lifting mechanism to a level such that the effective transport surface of the horizontal conveyor is above the abutment surface.

In order to prevent that during removal of the leading one of the packaged goods the packaged goods that follow will be engaged by the conveying movement of the horizontal conveyor, according to a further embodiment of the invention a stop is provided at the removal device at a side facing the storage track, whereby the stop is moved into a retaining position by actuation of the lifting mechanism and thus will retain the following one of the packaged goods to thus prevent it from being transported onto the removal device. In an improved embodiment, it is suggested that the stop is lifted together with the horizontal conveyor.

For a constructively simple realization of the lifting mechanism, it is suggested to design the horizontal conveyor such that it is pivotable about its end, which is projecting into the storage track, about a rotary axle that is at the same time the drive shaft.

In order to eliminate an individual power source for lifting the horizontal conveyor, including the packaged goods supported thereon, it is then suggested to derive the required force directly from the rotary movement of the common drive shaft. According to a preferred embodiment, it is suggested to provide a magnetic clutch for deriving the movement for at least a partial lifting of the horizontal conveyor from the rotary movement of the common drive shaft, whereby the magnetic clutch of each one of the removal devices can be controlled and actuated independently of the other magnetic clutches. The advantage of this embodiment is that, for actuation of the lifting mechanism, only relatively minimal amounts of current are to be supplied for the electrically activated magnetic clutch. The required lifting power, on the other hand, is derived from the drive movement of the common drive shaft by employing the magnetic clutch.

Preferably, the magnetic clutch has an annular member that surrounds the drive shaft. The magnetic clutch is supported by an articulated lever at the underside of the housing of the horizontal conveyor.

The invention further suggests a continuously driven transport device, extending transversely to the storage tracks and comprised of individual transport rollers, for moving the newly received packaged goods to the respective storage tracks.

This transport device is used for multiple storage tracks at the same time. In order to move the packaged goods transported on the transport device into the respectively selected storage track, in a further embodiment of the invention transverse conveyors having a conveying direction toward the storage tracks are provided between the transport rollers of the transport device.

According to another embodiment of the invention, each transverse conveyor is provided with its own lifting mechanism for at least partially lifting the transverse conveyor whereby the effective transport surface of the transfers conveyor is positioned below the upper side of the transport rollers when the lifting mechanism is in an inactive position and is positioned at least partially above the upper side of the transport rollers when the lifting mechanism is in an active position.

In order to avoid a separate drive for lifting the transverse conveyor including the packaged goods positioned thereon, the lifting force can also be derived from the drive energy for the transverse conveyor. For this purpose, it is suggested that a plurality of the transverse conveyors have a common drive shaft and that each one of the transverse conveyors has its own magnetic clutch for deriving the movement for at least a partial lifting of the transverse conveyor from the rotary movement of the common drive shaft. The magnetic clutch of each transverse conveyor can be controlled individually and separately from the other magnetic clutches of the other transverse conveyors.

It is furthermore suggested that the transport device at the order filling side of the storage device is comprised of transport rollers having an effective width that is at least twice the width of the rollers of the roller tracks and that the longitudinal axis of the transport rollers is positioned at a slant to the longitudinal (transport) direction of the storage tracks so that a conveying movement will result that transports the packaged goods away from the storage tracks.

BRIEF DESCRIPTION OF THE DRAWINGS

The object and advantages of the present invention will appear more clearly from the following specification in conjunction with the accompanying drawings, in which.

DESCRIPTION OF PREFERRED EMBODIMENTS

Figure 1:
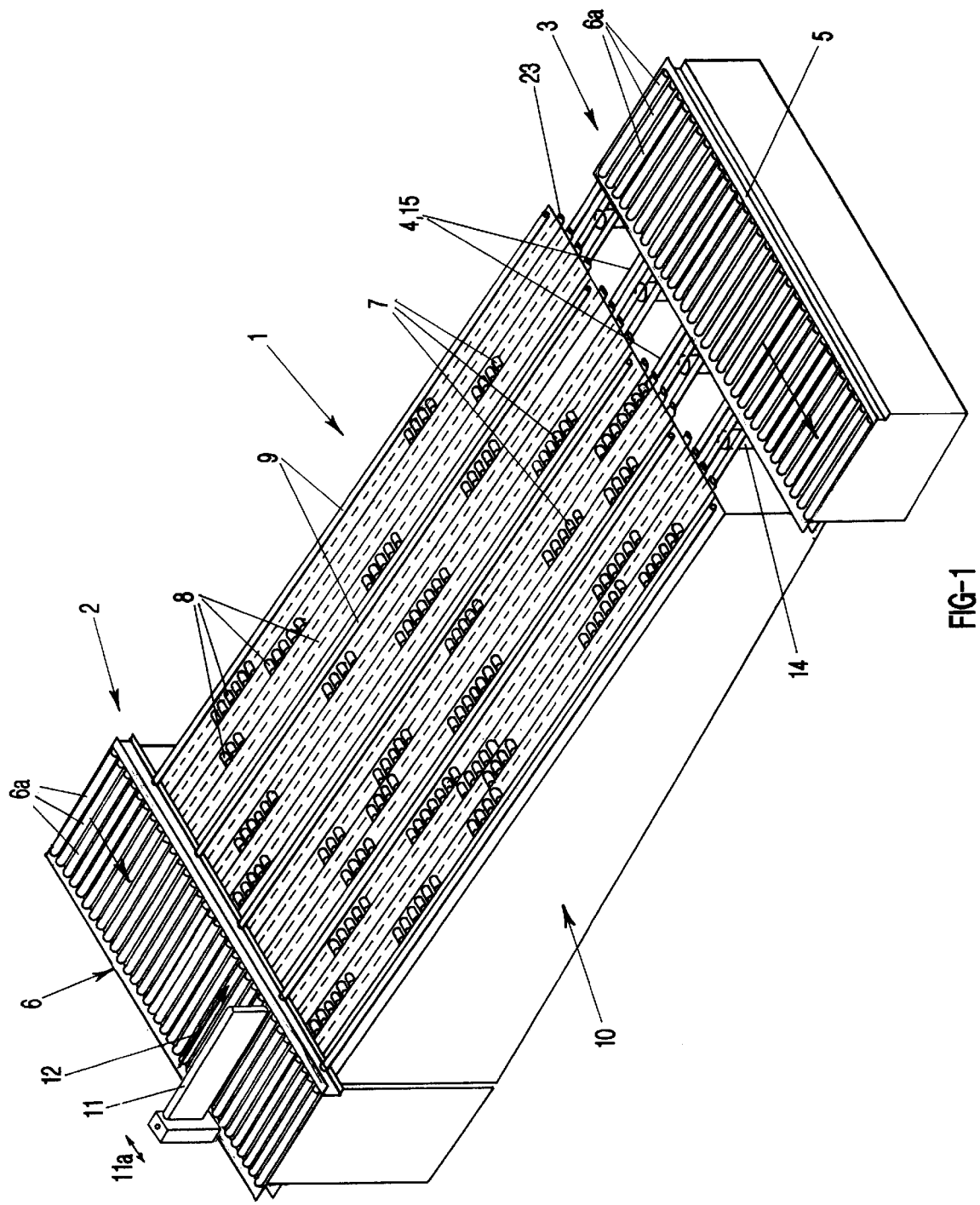
FIG. 1 is a perspective view of a portion of a storage device in a first embodiment.

The present invention will now be described in detail with the aid of several specific embodiments utilizing FIGS. 1 through 8.

The storage device for packaged goods, especially for groceries packaged in multi package units, which have a very high turnaround rate in wholesale, is comprised of a storage area 1, a supply area 2 upstream of the storage area 1, and an order filling area 3 downstream of the storage area. In the supply area 2 the packaged goods to be stored in the storage area are distributed into the storage area 1. The packaged goods (packages) have designated storage locations. In the order filling area 3 the individual packaged goods (packages) are removed in a computer-controlled manner from the storage area 1 and are then transported to a location where the compiled goods are then packaged further, if needed, and sent off to the client. For removing the individual packaged goods from the storage area 1, the removal devices 4 are provided which place the packaged goods, individually removed from the storage area 1, onto a transport device 5 along which the further transport of the goods takes place.

The supply of goods into the supply area 2 is also performed by a continuously driven transport device 6 which, like the transport device 5 in the order filling area 3, is comprised of a plurality of driven transport rollers 6a on which the transported goods are rolled and transported.

The storage area 1 is comprised of a plurality of storage tracks 7 which are arranged at a uniform height parallel to one another. The storage tracks 7 are positioned at a downwardly slant inclined toward the order filling area 3 and are comprised of roller tracks 8 of freely rotatable rollers. Due to the slight incline of the storage tracks 7, the goods that are stored thereon can move by their own weight along the respective storage track 7 until they hit an obstacle. The individual storage tracks 7 are separated by borders 9 from one another so that the goods cannot accidentally move into neighboring storage tracks. Each storage track 7 is provided with a brake device so that the rollers can be braked individually or in groups so that the goods moving along the storage tracks will not reach too great a velocity. For laterally guiding the goods, the rollers can be provided with wheel flanges.

Figure 2:
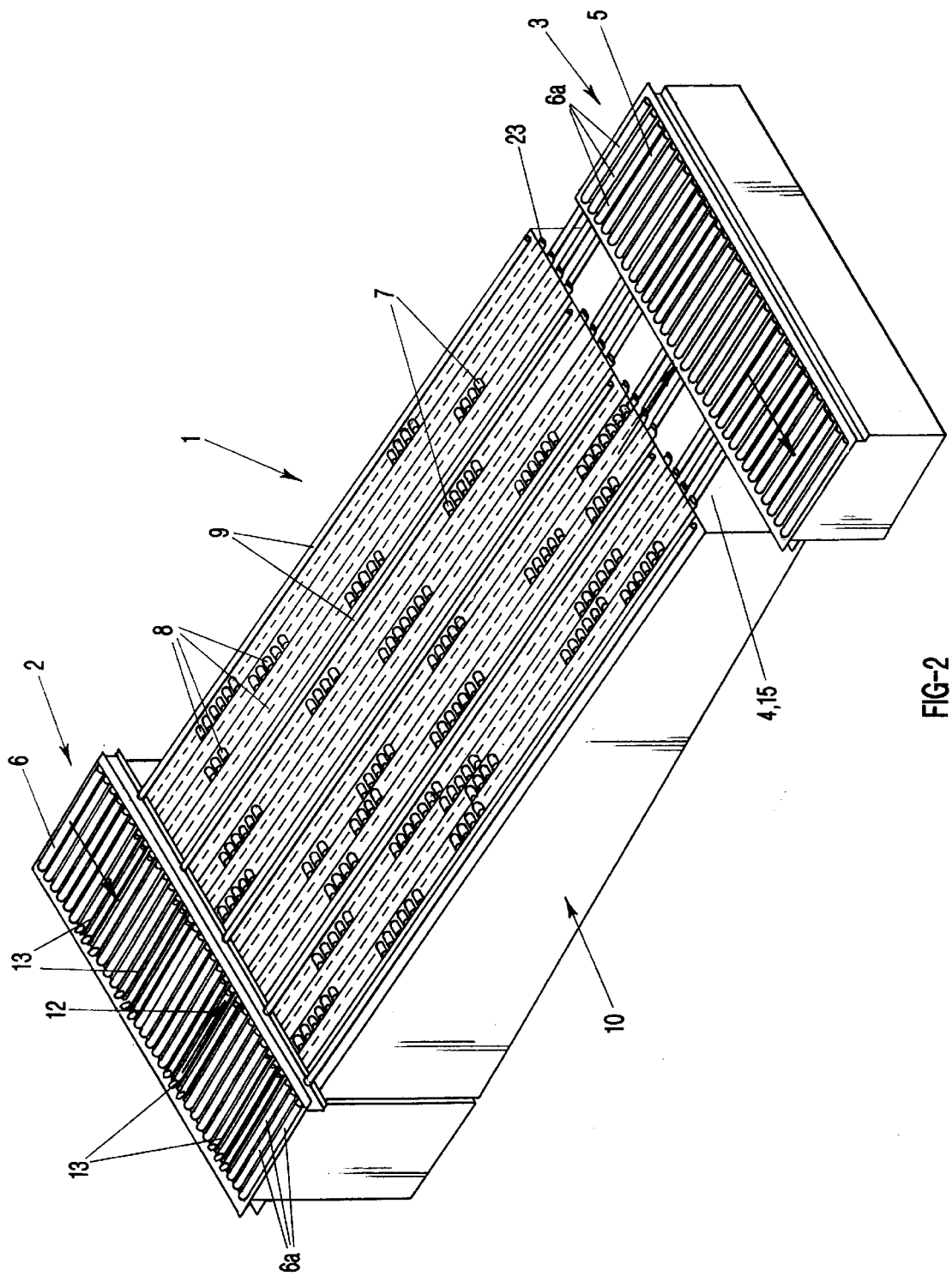
FIG. 2 is a perspective view of a portion of a storage device in a second embodiment.
Figure 3A:
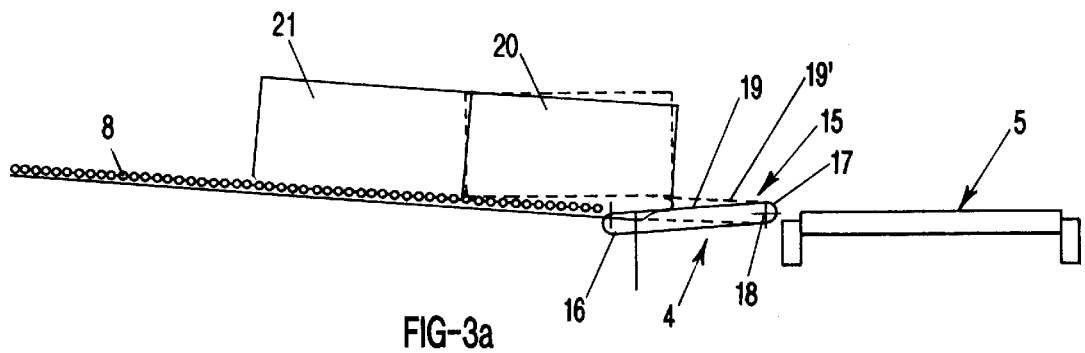
FIG. 3a shows a part-sectional view of the storage device in the area in which the individual packaged goods are removed by removal devices from the storage tracks of the storage area, whereby the removal devices are shown in their inactive position.
Figure 3B:
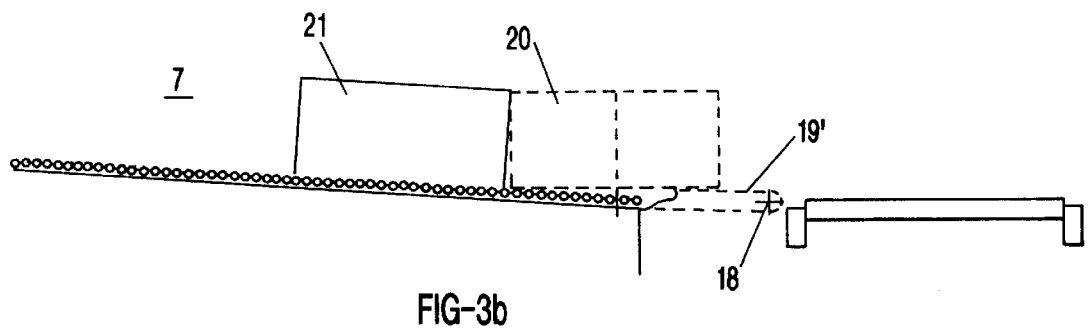
FIG. 3b shows in a representation according to FIG. 3a the removal devices in their active position.
Figure 3C:
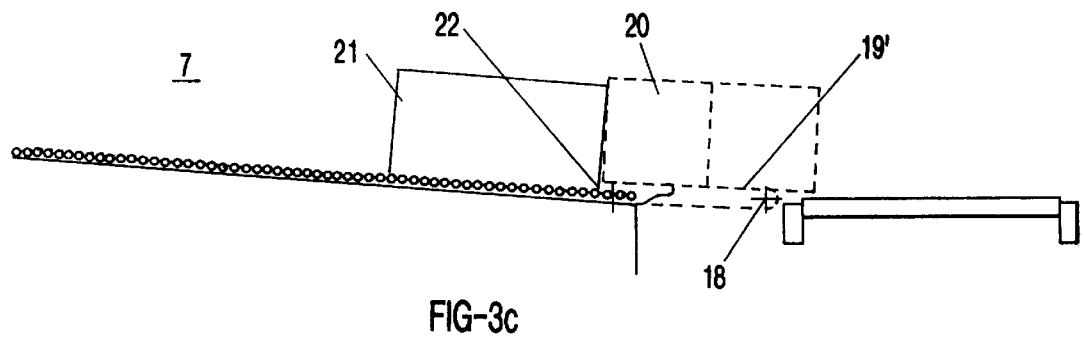
FIG. 3c shows, in a representation according to FIG. 3b, the packaged goods transported a little farther on the device.
Figure 3D:
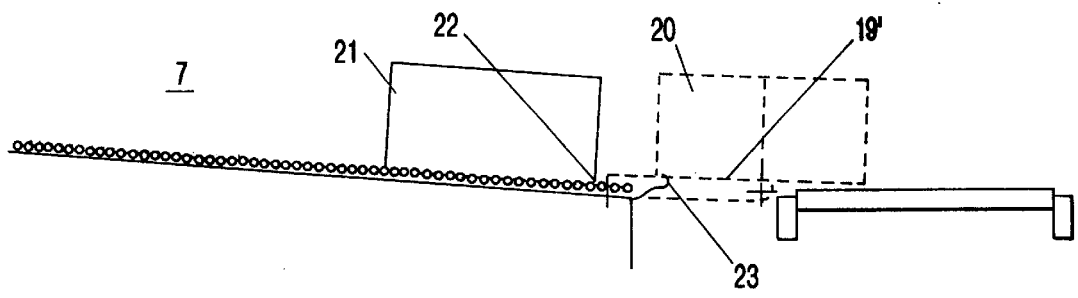
FIG. 3d shows, corresponding to the representation of FIG. 3c the packaged goods moved still farther along the device.

In the disclosed storage device each one of the storage tracks 7 contains only goods of one particular type. In the storage area 1 of FIGS. 1 and 2 showing a total of four storage tracks it is thus possible to store four different types of goods. The goods of the same type are positioned in a row within the respective storage track 7 whereby, due to the incline of the roller track 8, they move automatically to the end of the storage track 7 at the order filling area 3. The leading goods are retained at an abutment 23.

The four storage tracks 7 shown in FIGS. 1 and 2 form a module 10. A plurality of such modules can be arranged adjacent to one another so that, depending on the available space, up to 100 storage tracks can be positioned adjacent to one another and can be operated with common devices within the supply area 1 and the order filling area 3. In addition, the represented storage device can also be stacked so that an optimal use of the available space is possible.

The transport device 6 is common to all storage tracks 7 so that the transport device 6 will transport goods of different kinds. In order to move the goods into the designated storage tracks 7, in the shown embodiment of FIG. 1 transverse conveyors 11, having a conveying direction 12 in the direction toward the storage track 7, are shown positioned above the transport device 6. The transverse conveyors 11 can be moved according to arrow 11a along the transport device 6 in order to thus move into a position in front of a respective storage track 7 to be supplied with goods. In FIG. 1, the transverse conveyor 11 is arranged relative to the transport device 6 such that the goods received via the transport device 6 are to be moved into the third storage track from the right. The transverse conveyor 11 is preferably a belt conveyor having a high frictional value so that the goods can be transported transverse to the transporting direction of the transport device 6 on the respective transport rollers 6a. The movement of the transverse conveyor 11 relative to the length of the transport device 6 will be performed fully automatically as a function of the respective type of goods transported by the transport device 6. The identification of the goods can be realized by bar codes which are provided on the goods.

According to the embodiment of FIG. 2, it is also possible to provide each one of the storage tracks 7 with its own transverse conveyor 13 positioned between the transport rollers 6a of the transport device 6. This transverse conveyor is of a similar construction as the removal device 4.

Moreover, it is possible to position a second order filling area on the other side of the transport device 6 facing away from the storage tracks 7 so that via the transport device 6 order filling areas on both sides can be supplied. This is however, not shown in FIGS. 1 and 2. Of course, in this case the transverse conveyors 11, 13 should be designed to transport the goods in both directions.

In the order filling area 3, the goods which are removed by the removal devices 4 from the individual storage tracks 7 are moved onto the common transport device 5 which extends transversely to the storage tracks 7. Vertical rollers 14 with horizontal axis of rotation ensure transfer and deflection of the goods from the removal device 4 onto the transport device 5. Each individual storage track 7 has its removal device 4 so that the goods can be removed simultaneously from a plurality of storage tracks 7 and can be transferred onto the transport device 5.

The function and details of the removal devices 4 will be explained in the following with the aid of FIGS. 3a through 3d.

Each removal device 4 is comprised of a horizontal conveyor 15 and a lifting mechanism. The horizontal conveyor 15 is positioned as an extension of and is aligned with the storage track 7. The horizontal conveyor 15 is comprised of an endless belt which is guided about deflecting rollers (pulleys) and extends, when viewed in the conveying direction, with its rearward end 16 into the respective storage track 7. In order to allow for such overlap of the two transporting systems, between the rollers of the roller track 8 free spaces can be provided into which the transport belts of the horizontal conveyor 15 will fit.

In the conveying direction, the leading end 17 of the horizontal conveyor 15 extends into the vicinity of the transport device 5 so that at this location a delay-free and careful transfer of the goods onto the transport device 5 is realized which is further improved by the vertical rollers 14 represented in FIG. 1.

The lifting mechanism which is represented in detail in FIGS. 3a through 3d serves to lift the horizontal conveyor 15 or at least its effective transport surface. For this purpose, the horizontal conveyor 15 is pivotable about an axis 18 positioned at the forward end 17 so that the rearward end 16 of the horizontal conveyor 15 can be lifted. Upon actuation of the lifting mechanism, the effective transport surface of the horizontal conveyor 15 is thus lifted from the passive position 19 shown in FIG. 3a into the active position 19' shown in FIG. 3b. Only in the active position 19' will transport surface of the horizontal conveyor 15 engage from below the leading one 20 of the packaged goods positioned in the storage track 7. It is then engaged by the horizontal conveyor 15 and moved in the manner disclosed in FIGS. 3b through 3d in a sequence of steps onto the transport device 5.

For driving the horizontal conveyors two embodiments are possible. In the first embodiment, the horizontal conveyor 15 is driven only when it is in the active position 19' shown in dashed lines (see FIGS. 3a through 3d). When the horizontal conveyor 15 is in the inactive position 19, it is standing still.

However, a second embodiment, to be disclosed in the following with the aid of FIGS. 4a through 4c, 5, and 6, is preferred. The horizontal conveyor 15 is continuously operated, i.e., it rotates even when it is in the inactive position 19 which is the lowered position. The horizontal conveyor 15 in this case will move but not transport any of the goods and engages the leading one 20 of the goods only after being lifted and brought into contact with the underside of the package 20. The advantage of this embodiment is that the drive of multiple horizontal conveyors 15 can be realized by a common drive shaft. This common drive shaft represents at the same time the axis 18 about which the individual horizontal conveyors 15 can be moved from the inactive position 19 into the active position 19'. In this variation the control of the individual removal devices 4 thus is achieved exclusively by actuating the lifting mechanism, while the actual transport movement will be performed continuously. Every time the horizontal conveyor 15 is moved from the inactive position into the active position by actuating the lifting mechanism, an individual package 20 will be removed from the respective storage track 7.

In order to prevent that together with the leading package 20 also the following package 21 is engaged by the horizontal conveyor 15, in the area of the rearward, liftable end 16 of the horizontal conveyor 15 a stop 22 is attached against which the following package 21 will run. This package 21 can thus not roll any further as long as the horizontal conveyor 15 is in its active position 19'.

As soon as the horizontal conveyor 15 will return into its inactive position 19, after transfer of the leading package 20, the stop 22 will then release the following package 21 so that it will move forward until it hits the abutment 23 of the storage track 7 and thus becomes the leading package.

The abutment 23 projects past the support surface of the storage track 7 so that the horizontal conveyor 15 must be lifted by the lifting mechanism until the transport surface of the horizontal conveyor 15 is positioned above this abutment 23.

While the previously discussed FIGS. 3a through 3d show the design of the removal devices in a substantially schematic manner, in the following, with the aid of FIGS. 4a through 4c, 5, and 6, constructive details of the removal devices will be explained.

The horizontal conveyor 15 of the removal device 4 is comprised of a first pulley 24, having an axis coinciding with a drive shaft 18 and fixedly connected thereto, as well as a second pulley 25 which is positioned closer to the roller track 8. An endless belt 26 with a friction surface is guided about the two pulleys 24, 25. The pulley 25 is supported in a housing 27 which is pivotable about an axis of rotation 28 in the vicinity of the transport device 5. For a partial lifting of the horizontal conveyor 15 from the inactive position shown in FIG. 4a into the active position shown in FIGS. 4b and 4c, its rearward end 16, extending into the vicinity of the end of the roller track 8, is pivotable about the axis of rotation 28. Upon rotation, the rear pulley 25 that can be pivoted together with the housing 27 will be moved from its lower position into the lifted position so that the package 20 resting at the abutment 23 will be engaged from below and transported in the direction toward the transport device 4. This transport is shown in FIGS. 4b and 4c. Also shown is the stop 22 provided at the housing 27 of the removal device 4 which prevents that together with the leading package 20 also the following package 21 will be engaged by the horizontal conveyor 15. The stop 22, as shown in FIG. 4c, projects passed the transport surface of the roller track 8 so that the following package 21 will first come to rest at the stop 22. After lowering the removal device 4 into the position shown in FIG. 4a (inactive position), the following package can then move forward to the rigid abutment 23.

Figure 4A:
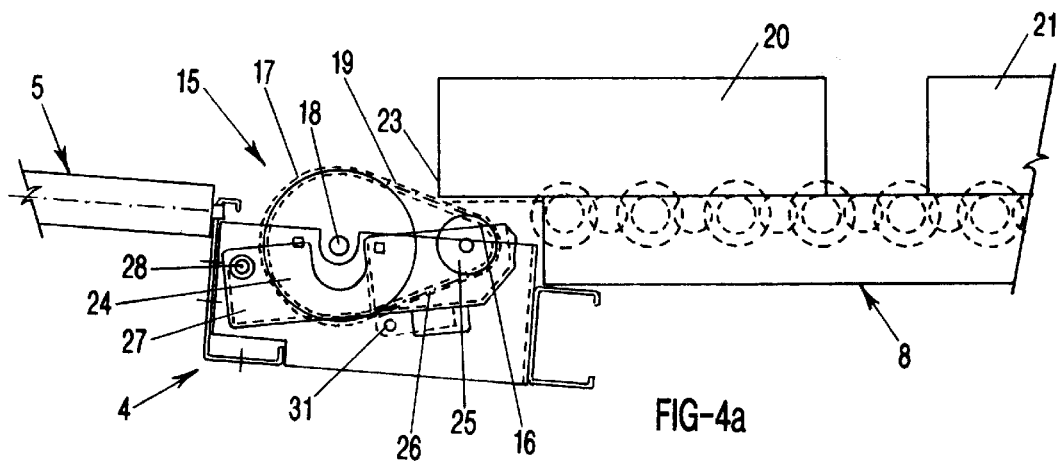
FIG. 4a shows another part-sectional view which differs from FIG. 3a in its constructive embodiment, whereby the storage device is shown in the area in which the individual packaged goods are removed by a removal device from the storage tracks of the storage area and whereby the removal device is shown in its inactive position.
Figure 4B:
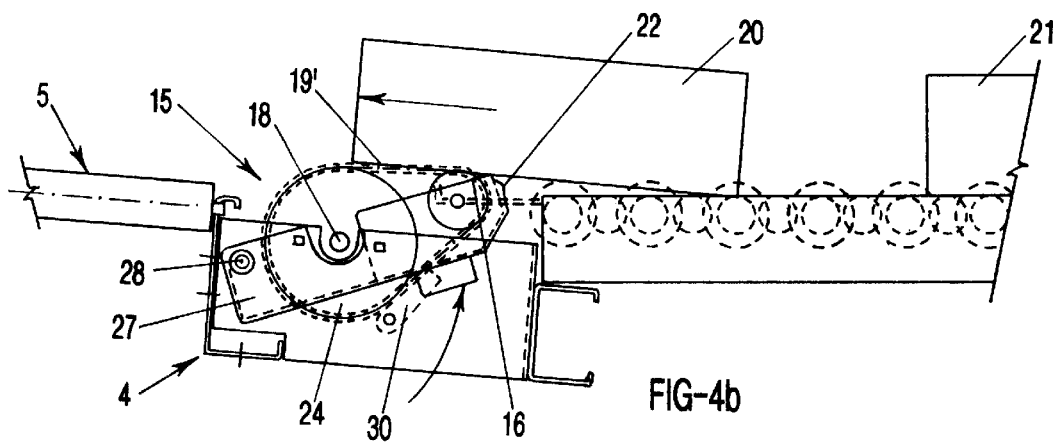
FIG. 4b shows the device of FIG. 4a with the removal device in the active position.
Figure 4C:
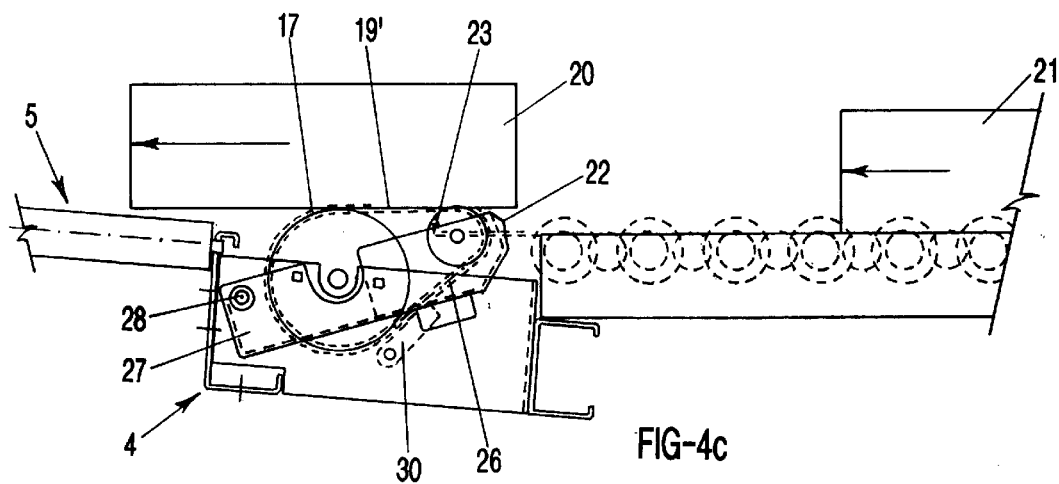
FIG. 4c corresponds to FIG. 4b but in comparison to FIG. 4b shows the removal device in an advanced state.
Figure 5:
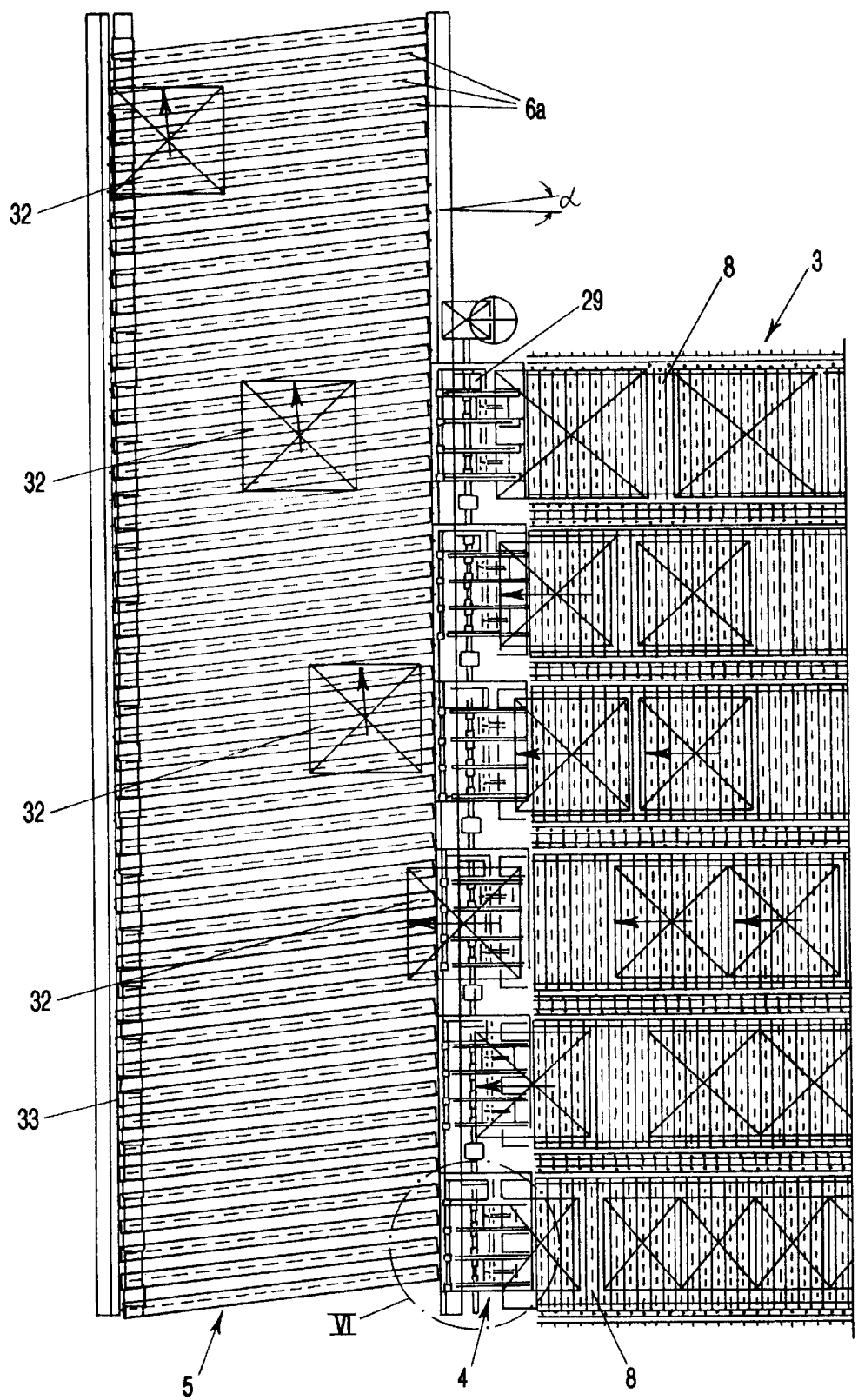
FIG. 5 shows a partial plan view of the storage device according to FIG. 2 in the area of the removal devices.
Figure 6:
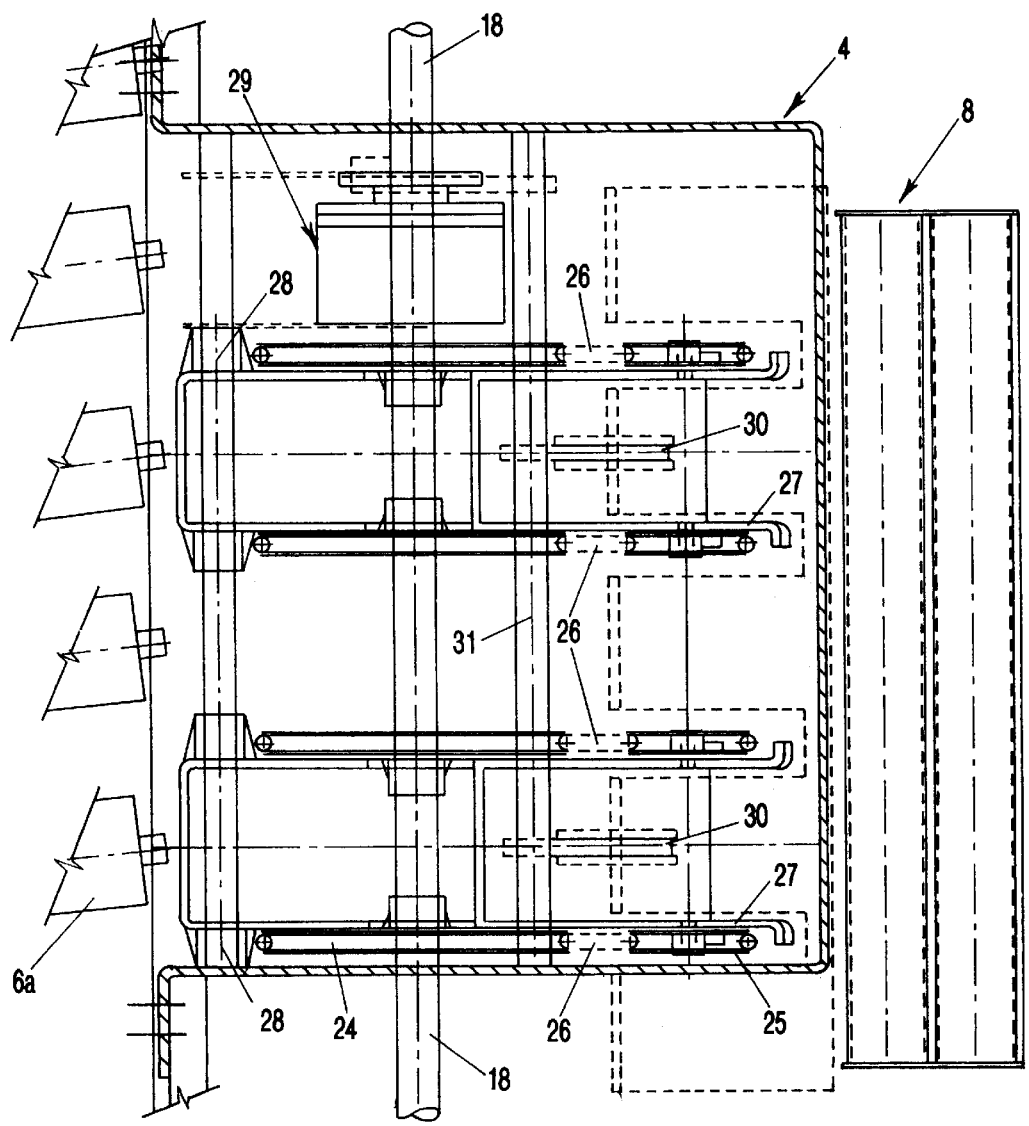
FIG. 6 shows in an enlarged representation the detail VI of FIG. 5.

The lifting mechanism shown in FIGS. 4a through 4c is realized by use of a magnetic clutch 29 shown in FIGS. 5 and 6. Each one of the removal devices 4 has one of these magnetic clutches 25 which are individually controlled and thus independent of the magnetic clutches of the other removal devices 4. The magnetic clutch 29 has an annular member surrounding the drive shaft 18 and is supported by an articulated lever 30 at the underside of the housing 27 of the horizontal conveyor 15. In this manner, the drive moment of the drive shaft 18 can be transformed via the magnetic clutch 29 into a pivot movement of the articulated lever 30 so that the housing 27 is rotated about its axis of rotation 28 in the upper direction. The force for lifting the horizontal conveyor, including the goods 20 supported thereon, is thus exclusively derived from the already present rotary movement of the drive shaft 18. The additional energy for each one of the control processes is thus limited to the relatively minimal energy required for operating the electrically magnetic clutch 29.

According to FIG. 6 the transmission member between the magnetic clutch 29 and the articulated lever 30 resting at the underside of the horizontal conveyor 15 may be in the form of a transmission linkage 31 which extends parallel to the drive shaft 18. In this manner, it is possible to employ a plurality of articulated levers 30 so that the housing 27 can be lifted without canting. This is especially advantageous because, in the shown embodiment, each one of the horizontal conveyors 15 is provided with four belts 26 in order to provide a wide transport surface.

FIG. 5 shows that the longitudinal axis of the transport rollers 6a of the transport device 5 are positioned at a slant (angle α) to the transport direction of the roller tracks 8. In this manner, the transport of the goods along the transport device 5 not only provides a conveying movement in the direction of the transport device itself but also a second conveying movement away from the storage tracks 7. FIG. 5 shows a sequence for a package 32 showing the effect of the slanted arrangement of the transport roller 6a which will cause the goods to move quickly to the outer edge 33 of the transport device 5. In this manner it is avoided that removed goods transported along the transport device 5 will present an obstacle to goods that are to be removed from storage tracks downstream. This also increases the operational freedom for the order filling process because when activating the individual removal devices 4 it must not be taken into consideration whether other goods are already present at the removal location. For an uninterrupted transport of the goods it is furthermore important that the effective width of the transport roller 6a is at least twice the width of the rollers of the roller tracks 8.

Figure 7:
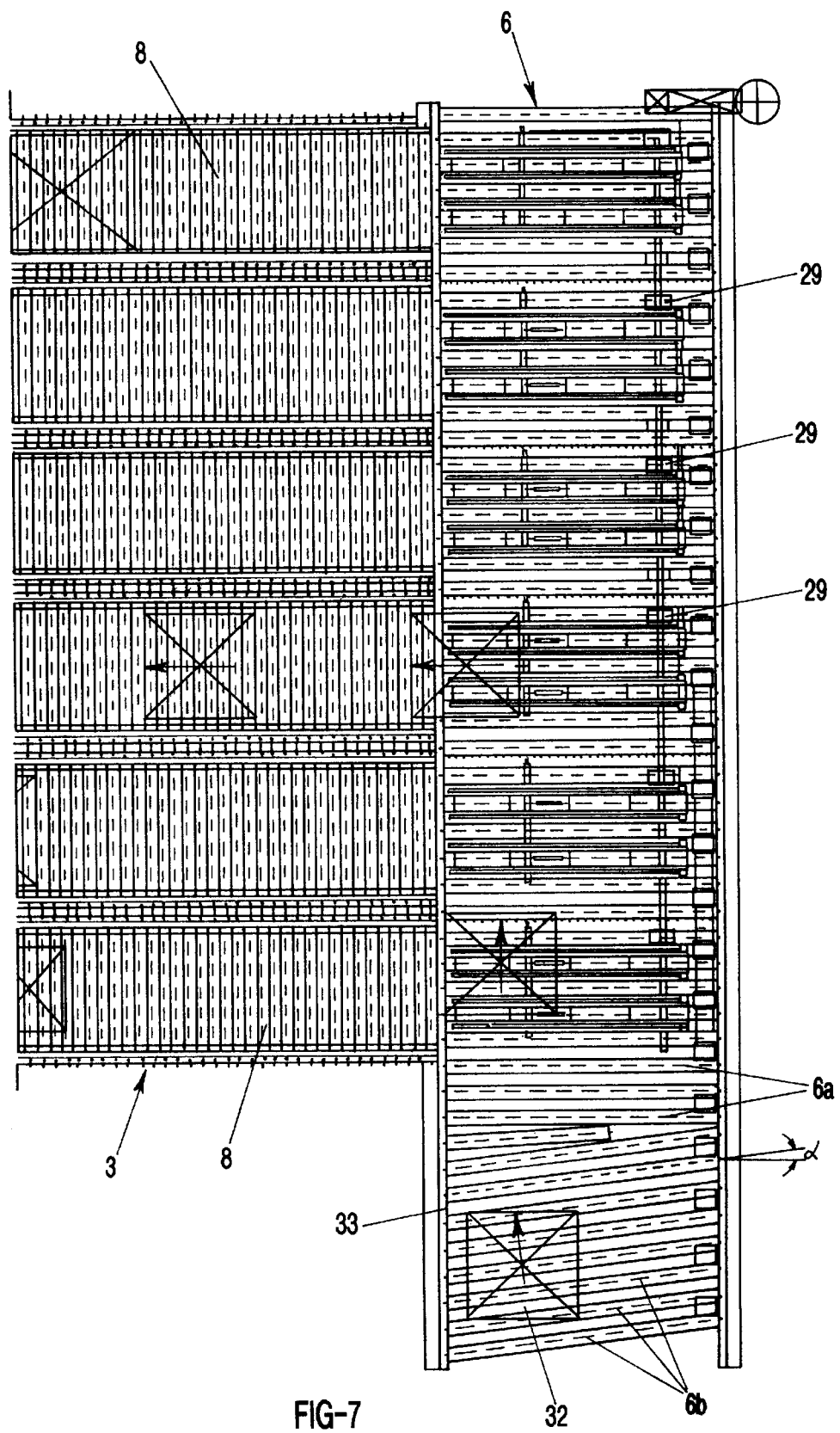
FIG. 7 shows a plan view of a portion of the storage device according to FIG. 2 in the supply area.

With the aid of FIGS. 7 and 8a through 8c, it will be explained in the following that also in the supply area 2 of the inventive storage device conveying devices can be used which are very similar to the conveying devices in the order filling area 3. FIG. 7 shows packaged goods 32 that are transported because of the slanted position of the transport rollers 6b at an angle α to the edge 33 of the transport device 6 which is positioned in close proximity to the storage tracks 7. This achieves that the supplied packaged goods 32 will always be positioned along this edge 33 of the transport device 6 before the packaged goods are to be moved into the individual storage tracks 7. In front of the storage tracks 7 the transport rollers 6a are, however, positioned so as to be aligned with the transport direction of the storage tracks.

The transverse conveyors 13 are positioned between neighboring transport rollers 6a. The driven transport rollers 6a have sufficient spacing between them in the transport direction. The transverse conveyors 13 operate, as has been explained previously in connection with the order filling area, by employing endless belts 34 which are guided about pulleys 35, 36. The pulleys 35 are driven by a common drive shaft 37 that engages all of the transverse conveyors 13. The transverse conveyor 13 is positioned in a housing 39 that can be pivoted about an axis of rotation 38. The axis of rotation 38 is located at the end of the transverse conveyor facing away from the storage tracks 7.

Figure 8A:
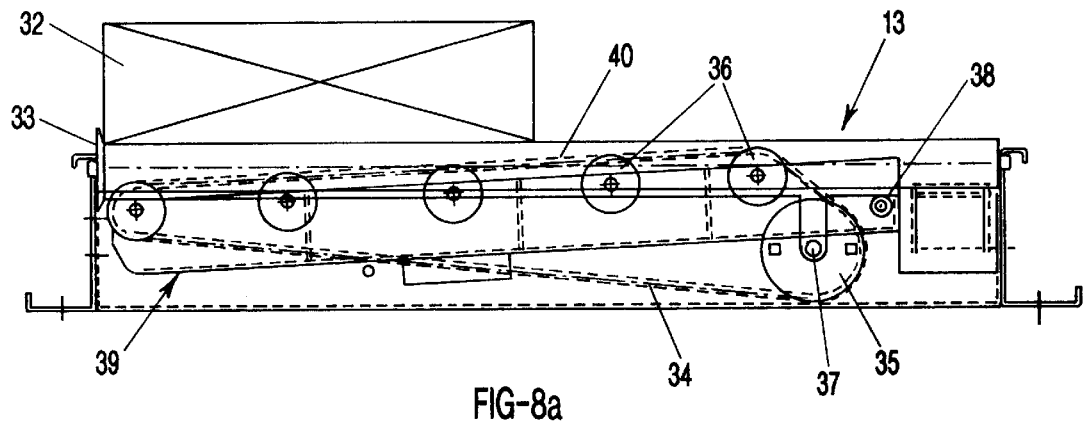
FIG. 8a shows a part-sectional view of the storage device in the supply area, whereby a transverse conveyor arranged thereat is shown in the inactive position.
Figure 8B:
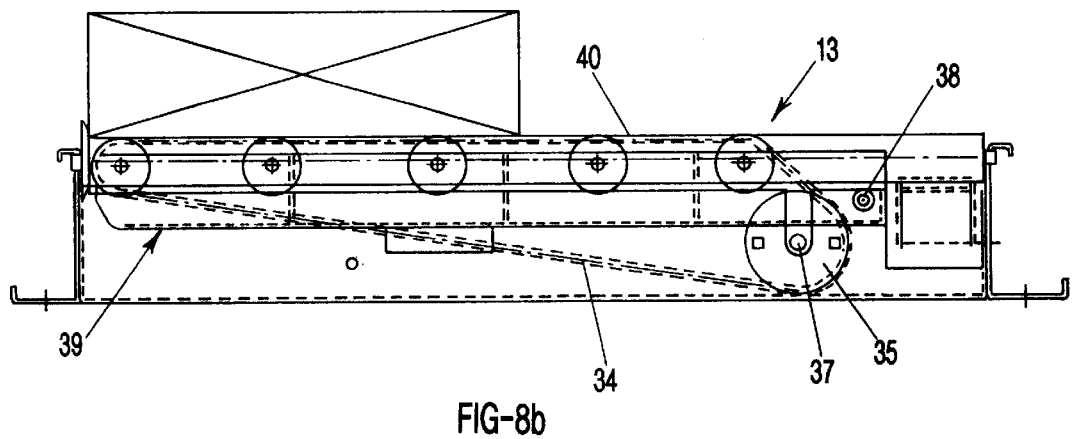
FIG. 8b corresponds to the representation of FIG. 8a but with the transverse conveyor shown in the active position.
Figure 8C:
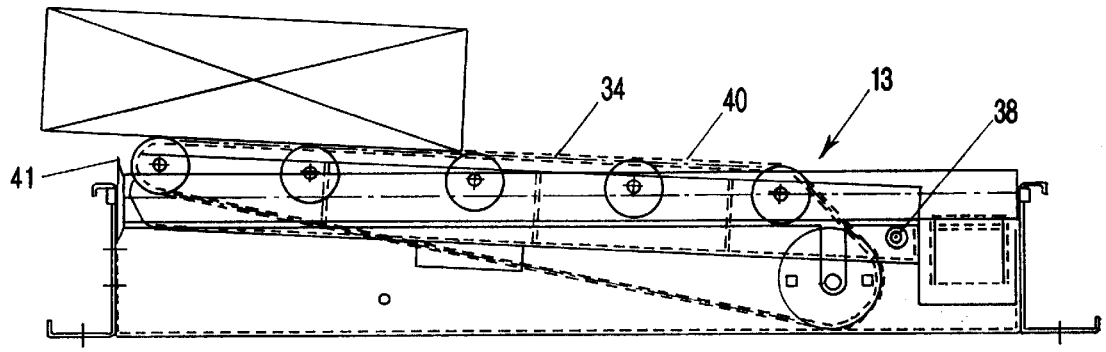
FIG. 8c corresponds to FIG. 8b but in comparison to FIG. 8b the device is shown in an advanced functional state.

With the aid of FIGS. 8a, 8b, and 8c, the function of the transverse conveyor 13 will be explained. FIG. 8a shows the inactive position. The packaged goods 32 roll along the transport rollers 6a without the transverse conveyance being performed. Upon actuation of the transverse conveyor, it is lifted according to FIG. 8b, so that the housing 39 is rotated about the axis of rotation 38. The arrangement is such that the effective transport surfaces of the belt 34 and the transport rollers 6a are positioned at the same level when the effective transport surface of the belt 34 and the upper side of the transport rollers 6a are exactly parallel to one another. This is shown in FIG. 8b. Subsequently, as is shown in FIG. 8c, the pivoting action of the housing 39 results in the effective transport surface 40 of the belt 34 being positioned at a slant above the upper side of the transport roller 6a so that the respective package 32 will be transported into the respective storage track even across possible obstacles. Such an obstacle may be the wheel flange 41 of the transport rollers 6a.

The lifting mechanism for pivoting the housing 39 about its axis of rotation 38 functions in the same manner as disclosed above in connection with FIGS. 3a through 3d and 4a through 4c for the removal devices 4. The drive of all transverse conveyors 13 is realized by a common drive shaft 37, and each one of the transverse conveyors 13 is provided with its own magnetic clutch 29 for deriving from the movement of the drive shaft 37 the pivoting action and thus the partial lifting of the housing 39 of the transverse conveyor. Furthermore, each one of the magnetic clutches 29 can be controlled and actuated independent of the other magnetic clutches so that each one of the storage tracks 7 can be selected independently for transport of respective goods, arriving via the transport device 6, into the respectively selected storage tracks 7.

The specification incorporates by reference the disclosure of German priority document 198 23 083.4 of May 22, 1998.

The present invention is, of course, in no way restricted to the specific disclosure of the specification and drawings, but also encompasses any modifications within the scope of the appended claims.

What is claimed is:

1. A computer-controlled storage device for packaged goods, said device comprising:
   a storage area (1) comprised of parallel storage tracks (7) having a first end and a second end, wherein each one of said storage tracks (7) stores only one type of packaged goods, said storage tracks (7) comprised of roller tracks (8);
   a supply area (2) positioned at said first ends of said storage tracks (7);
   said supply area (2) having a feeding device (6, 11) feeding newly arriving packaged goods into a respective one of said storage tracks (7);
   an order filling area (3), positioned at said second ends of said storage tracks (7), wherein in said order filling area (3) packaged goods are compiled to fill a customer order;
   said order filling area (3) comprising independently operated removal devices (4) for each one of said storage tracks (7);
   wherein each one of said removal devices comprises a horizontal conveyor (15) for transporting the packaged goods and a stop (22) for retaining temporarily packaged goods following a leading one of said packaged goods, and wherein each one of said horizontal conveyors (15) is comprised of a first pulley (24) fixedly connected to a drive shaft (18), a second follower pulley (25), and a drive belt guided about said first and second pulleys (24, 25), said stop (22) pivotable between a raised position projecting past a transport surface of the roller tracks (8) and a lowered position, whereby the movement of the horizontal conveyors (15) and the stop (22) is controlled by rotation of the drive shaft (18).

2. A device according to claim 1, further comprising a continuously driven transport device (5) positioned downstream of said removal devices (4) perpendicularly to said storage tracks (7) and receiving packaged goods from said removal devices (4).

3. A device according to claim 1, wherein said roller tracks (8) are downwardly slanted from said supply area (2) toward said order filling area (3), wherein each one of said roller tracks (8) is comprised of freely rotating, non-driven rollers.

4. A device according to claim 3, wherein said roller tracks (8) have a brake device braking individual rollers or groups of rollers.

5. A device according to claim 3, wherein said transport device (5) is comprised of transport rollers (6a) having a width that is at least twice a width of said non-driven rollers of said roller tracks (8) and wherein a longitudinal axis of said transport rollers (6a) are positioned at a slant to a transport direction of said storage tracks (7), resulting in a conveying moment away from said storage tracks (7).

6. A device according to claim 1, further comprising a lifting mechanism lifting the horizontal conveyor (15) into an active position.

7. A device according to claim 6, wherein at least some of said horizontal conveyors (15) include said common drive shaft (18), said drive shaft (18) extending perpendicularly to said storage tracks (7).

8. A device according to claim 7, wherein said horizontal conveyors (15) each have a first end (16) projecting into said storage tracks (7) and wherein said first ends (16) are pivotable about a rotational axis (28).

9. A device according to claim 7, wherein each one of said removal devices (4) has a magnetic clutch (29) for converting a rotational movement of said common drive shaft (18) into a lifting movement of said horizontal conveyors (15), wherein said magnetic clutches (29) are separately actuatable.

10. A device according to claim 9, wherein said horizontal conveyors (15) each comprise a housing (27), wherein said magnetic clutch (29) comprises an annular member surrounding said drive shaft (18) and further comprises an articulated lever (30) supporting said magnetic clutch (29) at an underside of said housing (27).

11. A device according to claim 6, wherein each one of said roller tracks (8) is comprised of freely rotating, non-driven rollers, wherein said horizontal conveyors (15) are lifted by said lifting mechanism to a level where a transport surface of said horizontal conveyors (15) is above a support surface of said roller tracks (7) for the packaged goods.

12. A device according to claim 11, wherein said second end of each one of said storage tracks (7) has an abutment (23) projecting upwardly past said support surface of said roller tracks (7), wherein a leading one of the packaged goods on said support tracks (7) rests at said abutment (23), and wherein said level to which said horizontal conveyors (15) are lifted is above said abutment (23).

13. A device according to claim 12, wherein said stop (22) is positioned at a side of said removal devices (4) facing said storage tracks (7), said stop (22) lifted into a retaining position when said lifting mechanism lifts said removal device (4).

14. A device according to claim 13, wherein said stop (22) and said horizontal conveyor (15) are lifted simultaneously by said lifting mechanism.

15. A device according to claim 6, wherein said stop (22) is lifted by operation of said lifting mechanism.

16. A device according to claim 1, wherein said feeding device (6, 11, 13) comprises transverse conveyors (13), wherein each one of said storage tracks (7) has one of said transverse conveyors (13) arranged thereat for moving the packaged goods from said transport device (6) onto said storage tracks (7), and wherein said transverse conveyors (13) are positioned respectively between two neighboring transport rollers (6a) and are actuated individually.

17. A device according to claim 16, wherein each one of said transverse conveyors (13) has a transport surface and a lifting mechanism, wherein said transport surface is positioned below an upper side of said transport rollers (6a) when said lifting mechanism is in an inactive position and is positioned at least partially above said upper side of said transport rollers (6a) when said lifting mechanism is in an active position.

* * * * *